United States Patent
Kim et al.

(10) Patent No.: US 11,135,782 B2
(45) Date of Patent: Oct. 5, 2021

(54) MANUFACTURING METHOD AND DEVICE OF CARBON FIBER SHEET MOLDING COMPOUND

(71) Applicant: TORAY ADVANCED MATERIALS KOREA, INC., Gyeongsangbuk-do (KR)

(72) Inventors: Kwang-Su Kim, Gyeongsangbuk-do (KR); Hwang-Yong Kim, Gyeongsangbuk-do (KR); Chang-Won Kang, Gyeongsangbuk-do (KR)

(73) Assignee: TORAY ADVANCED MATERIALS KOREA, INC., Gyeongsangbuk-do (KR)

( * ) Notice: Subject to any disclaimer, the term of this patent is extended or adjusted under 35 U.S.C. 154(b) by 390 days.

(21) Appl. No.: 16/304,715

(22) PCT Filed: Oct. 26, 2017

(86) PCT No.: PCT/KR2017/011930
§ 371 (c)(1),
(2) Date: Nov. 27, 2018

(87) PCT Pub. No.: WO2018/147526
PCT Pub. Date: Aug. 16, 2018

(65) Prior Publication Data
US 2019/0134927 A1 May 9, 2019

(30) Foreign Application Priority Data
Feb. 8, 2017 (KR) .................. 10-2017-0017480

(51) Int. Cl.
*B29C 70/18* (2006.01)
*B29C 70/50* (2006.01)
(Continued)

(52) U.S. Cl.
CPC ............ *B29C 70/18* (2013.01); *B29B 15/122* (2013.01); *B29C 70/50* (2013.01); *B29C 70/54* (2013.01);
(Continued)

(58) Field of Classification Search
CPC ....... B29B 15/122; B29C 70/18; B29C 70/50; B29C 70/54; B29K 2307/04;
(Continued)

(56) References Cited

U.S. PATENT DOCUMENTS

2003/0099734 A1   5/2003  Bradish
2015/0184333 A1*  7/2015  Arai .......................... C08J 5/06
                                                                                                      428/327

FOREIGN PATENT DOCUMENTS

CN        101711230 A    5/2010
JP        H08-192424 A    7/1996
(Continued)

OTHER PUBLICATIONS

International Search Report from corresponding PCT Application No. PCT/KR2017/011930, dated Jan. 18, 2018, and it's English translation.
(Continued)

*Primary Examiner* — Camie S Thompson
(74) *Attorney, Agent, or Firm* — Harness, Dickey & Pierce, P.L.C.

(57) ABSTRACT

Provided is a method of manufacturing a carbon fiber sheet molding compound, the method including: performing sizing treatment on a carbon fiber using a sizing agent; cutting the sizing-treated carbon fiber into pieces; spraying the pieces of carbon fiber onto a first resin coated on a surface of a first carrier sheet; and uniting together a second resin coated on a second carrier sheet and a surface of the first
(Continued)

resin, wherein the sizing agent, the first resin, and the second resin include the same compounds.

6 Claims, 3 Drawing Sheets

(51) Int. Cl.
  *B29C 70/54* (2006.01)
  *B29B 15/12* (2006.01)
  *B29K 307/04* (2006.01)
  *B29K 67/00* (2006.01)
  *B29K 263/00* (2006.01)
  *B29K 31/00* (2006.01)

(52) U.S. Cl.
  CPC ...... *B29K 2031/00* (2013.01); *B29K 2067/06* (2013.01); *B29K 2263/00* (2013.01); *B29K 2307/04* (2013.01)

(58) Field of Classification Search
  CPC ............ B29K 2263/00; B29K 2067/06; B29K 2031/00; C08G 59/38; Y10T 428/254; Y10T 428/31511; D06M 15/55; D06M 2101/40; C08L 63/00; C08J 2363/00; C08J 5/06; C08J 5/10; C08J 5/24
  USPC ............ 428/327, 413, 297.4, 375, 364, 394, 428/299.1, 300.7, 361; 156/250; 264/257, 118, 128, 13; 427/289, 285.5, 427/214, 372.2, 379, 384
  See application file for complete search history.

(56) References Cited

FOREIGN PATENT DOCUMENTS

| | | |
|---|---|---|
| JP | 2000-098718 A | 4/2000 |
| JP | 2001-214334 A | 8/2001 |
| JP | 2001-271230 A | 10/2001 |
| JP | 2009-062648 A | 3/2009 |
| JP | 4365502 B2 | 11/2009 |
| JP | 2010-163536 A | 7/2010 |
| KR | 10-2008-0101758 A | 11/2008 |
| KR | 10-2014-0065787 A | 5/2014 |
| KR | 10-2014-0072130 A | 6/2014 |
| KR | 10-1539049 B1 | 7/2015 |
| KR | 10-1652002 B1 | 8/2016 |

OTHER PUBLICATIONS

Office Action from corresponding Chinese Patent Application No. 201780020614.8, dated Dec. 17, 2019.
Extended European Search Report from corresponding European Patent Application No. 17895805.4, dated Oct. 22, 2019.
Campbell, F.C.,; "Manufacturing processes for advanced composites", Jan. 1, 2004, Elsevier Advanced Technology, Oxford GB, pp. 304-356.
Drzal, L. T.; "Interface and interphases", Composites, Dec. 1, 2001, ASM International, pp. 169-179.
Office Action from corresponding Japanese Patent Application No. 2019-500205, dated Aug. 26, 2019.
Office Action and Search Report form corresponding Russian Patent Application No. 2018135678/05, dated Dec. 4, 2019.
Office Action and Search Report from corresponding Taiwanese Patent Application No. 106142743, dated Sep. 4, 2018.

\* cited by examiner

MANUFACTURING METHOD AND DEVICE OF CARBON FIBER SHEET MOLDING COMPOUND

CROSS-REFERENCE TO RELATED APPLICATIONS

This application is a national phase application of PCT Application No. PCT/KR2017/011930, filed on Oct. 26, 2017, which claims the benefit and priority to Korean patent application No. 10-2017-0017480, filed on Feb. 8, 2017. The entire disclosures of the applications identified in this paragraph are incorporated herein by references.

FIELD

The following description relates to a method and apparatus for manufacturing a carbon fiber sheet molding compound, and more particularly, to a method and apparatus for manufacturing a carbon fiber sheet molding compound which can improve adhesion and dispersion between a carbon fiber and a resin.

BACKGROUND

Fiber reinforced plastics (FRP) refer to plastics reinforced by impregnating a reinforcing material such as fibers with a resin to enhance mechanical strength, heat resistance, tensile strength and impact resistance, and types of FRP include a bulk molding compound, a sheet molding compound, and the like.

The sheet molding compound can be molded at room temperature and atmospheric pressure, has a strong resistance to corrosion from acids, alkali, salts, solvents, seawater, etc., and is also excellent in strength, heat resistance, and corrosion resistance, so that it is widely used as a semi-permanent element for various industrial sector processes.

The use of a carbon fiber sheet molding compound using, particularly, carbon fibers as reinforcing fibers is increasing because the carbon fiber has characteristics of light weight and high rigidity as compared to other reinforcing fibers.

However, in general, carbon fibers have low adhesiveness with unsaturated polyester or vinyl ester resin used as a resin of a sheet molding compound, so that their characteristics are not sufficiently exhibited and uniform distribution thereof is difficult, and since the carbon fibers are formed with thousands to tens of thousands of strands gathered, it is difficult to cut the carbon fibers.

Therefore, it is required to develop a manufacturing process or a manufacturing apparatus for more effectively applying carbon fibers to a sheet molding compound.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The objective of the present invention is to provide a method and apparatus for manufacturing a carbon fiber sheet molding compound capable of improving adhesion and dispersion between a carbon fiber and a resin and having excellent mechanical physical properties.

In one general aspect, there is provided a method of manufacturing a carbon fiber sheet molding compound, the method including: performing sizing treatment on a carbon fiber using a sizing agent; cutting the sizing-treated carbon fiber into pieces; spraying the pieces of carbon fiber onto a first resin coated on a surface of a first carrier sheet; and uniting together a second resin coated on a second carrier sheet and a surface of the first resin, wherein the sizing agent, the first resin, and the second resin include the same compounds.

The sizing agent, the first resin, and the second resin may include at least one of vinyl ester, unsaturated polyester, and epoxy.

The sizing treatment may be performed in such a state in which the carbon fiber is spread to be 1.2 to 5 times as wide as an original width thereof.

In the sizing treatment of the carbon fiber, the carbon fiber may be coated with the sizing agent in an amount of from 1 to 10% by weight based on the total weight of the carbon fiber.

In another general aspect, there is provided an apparatus for manufacturing a carbon fiber sheet molding compound, the apparatus including: a fiber pretreatment portion which performs sizing-treatment on a carbon fiber; and a sheet manufacturing portion which manufactures a sheet using the carbon fiber pretreated by the fiber pretreatment portion, wherein the fiber pretreatment portion sequentially includes a fiber roll to supply the carbon fiber, a storage tank containing a sizing agent, and a cutting device to cut the carbon fiber, the sheet manufacturing portion includes a sheet roll to supply a carrier sheet and a resin coating portion containing a resin to be coated on a surface of the carrier sheet, and the sizing agent and the resin include the same compound.

The storage tank may include a plurality of rollers and the plurality of rollers may be arranged alternately vertically one above another in a depth direction of the storage tank.

Each of the fiber pretreatment portion and the sheet manufacturing portion may include a drying furnace.

Other features and aspects will be apparent from the following detailed description, the drawings, and the claims.

Figure 1:
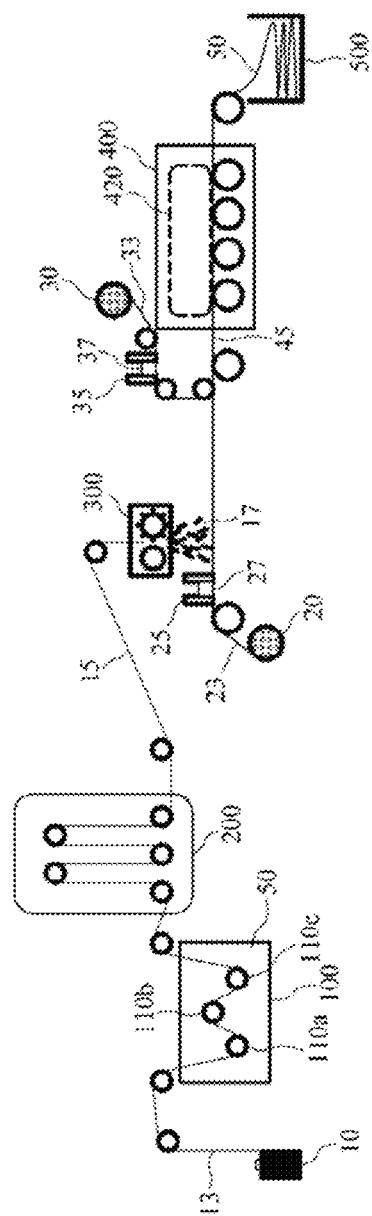
FIG. 1 is a cross-sectional view of an apparatus for manufacturing a carbon fiber sheet molding compound according to one embodiment of the present invention.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Hereinafter, embodiments of the present invention will be described in detail with reference to the accompanying drawings so as to be easily practiced by a person of ordinary skill in the art. It should be understood that the present invention is not to be construed as limited to the embodiments set forth herein and may be embodied in many different forms.

Any redundant descriptions of well-known parts will be omitted for clarity, and like reference numerals refer to like elements throughout the specification.

Sizes and thicknesses of elements in the drawings may be exaggerated for convenience of description. In other words, since sizes and thicknesses of components in the drawings are arbitrarily illustrated for convenience of description, the following embodiments are not limited thereto. In the drawings, thicknesses are enlarged for clarity of various layers and regions, and thicknesses of some layers and regions are exaggerated for convenience of description.

In the specification, unless explicitly described to the contrary, the word "comprise" and variations such as "comprises" or "comprising," will be understood to imply the inclusion of stated elements but not the exclusion of any other elements.

Hereinafter, a method and apparatus for manufacturing a carbon fiber sheet molding compound according to embodiments of the present invention will be described in detail with reference to FIG. 1.

FIG. 1 is a cross-sectional view of an apparatus for manufacturing a carbon fiber sheet molding compound according to one embodiment of the present invention.

Referring to FIG. 1, an apparatus for manufacturing a carbon fiber sheet molding compound according to one embodiment of the present invention includes a fiber pretreatment portion 1000 and a sheet manufacturing portion 2000.

First, the fiber pretreatment portion 1000 will be described in detail.

The fiber pretreatment portion 1000 according to one embodiment of the present invention is configured to size a carbon fiber 13 to be contained in a carbon fiber sheet molding compound, and may include a fiber roll 10 of wound carbon fiber 13, a storage tank 100 containing a sizing agent 50, a first drying furnace 200, and a cutting device 300 to cut a sizing-treated carbon fiber 15.

For convenience of illustration, FIG. 1 only shows one fiber roll 10 on which the carbon fiber 13 is wound, but a plurality of fiber rolls 10 may be provided.

The carbon fiber 13 wound on the fiber roll 10 may be a carbon fiber 13 which has been subjected to sizing treatment more than once in order to gather filaments thereof into strands.

The carbon fiber 13 wound on the fiber roll 10 may be supplied to the storage tank 100 containing the sizing agent for sizing treatment and may be subjected to the sizing treatment.

The storage tank 100 may include the sizing agent 50 for the sizing treatment of the carbon fiber 13 and a plurality of rollers 110a, 110b, and 110c to allow the sizing agent 50 to be easily impregnated between the filaments of the carbon fiber 13 by spreading the strands of carbon fiber.

The plurality of rollers 100a, 100b, and 100c may be arranged alternately vertically one above another in a depth direction of the storage tank 100.

For convenience of illustration, FIG. 1 shows the first roller 100a and the third roller 100c positioned relatively low and the second roller 100b positioned relatively high between the first roller 100a and the third roller 100c, but an additional roller may be further provided as needed in the process.

The sizing agent 50 in the storage tank 100 may include the same resin as a resin used in the manufacturing of the carbon fiber sheet molding compound to be described later.

The sizing agent 50 may include at least one of vinyl ester, unsaturated polyester, and epoxy.

The sizing treatment of the carbon fiber 13 in the storage tank 100 may be carried out so that the carbon fiber 13 is 1.2 to 5 times as wide as the width of the carbon fiber 13 supplied to the storage tank 100 and thereby the sizing agent 50 can be uniformly impregnated between the filaments of the carbon fiber 13.

When the carbon fiber 13 is spread to be less than 1.2 times of the original width of the carbon fiber 13, it may be difficult for the sizing agent 50 to be uniformly impregnated between the filaments of the carbon fiber 13, and when the carbon fiber 13 is spread to be more than 5 times of the original width, the tensile strength of the carbon fiber 13 is increased and the carbon fiber 13 may be damaged, which may result in deterioration of physical properties or problems in the process.

The amount of the sizing agent 50 coated on the carbon fiber 13 during the sizing treatment of the carbon fiber 13 may be 1% to 10% by weight based on the total weight of the carbon fiber 13.

This is because when the sizing agent 50 is coated at less than 1% by weight, adhesion to the resin of the carbon fiber sheet molding compound or cutting efficiency of the carbon fiber sheet molding compound is difficult to be improved and when the sizing agent 50 is coated in an amount of more than 10% by weight, it is difficult to dry the coated sizing agent 50 and the dried carbon fiber 15 may be broken due to degraded flexibility thereof.

The carbon fiber 13 coated with the sizing agent 50 in the storage tank 100 may be dried while passing through the first drying furnace 200.

The sized carbon fiber 15 having passed through the first drying furnace 200 may be transferred to the cutting device 300 and be cut to a size suitable for the manufacturing process of the carbon fiber sheet molding compound, and then pieces of carbon fiber 15 may be supplied to the sheet manufacturing portion 2000.

In this case, the carbon fiber 15 may be cut to a length of 1 to 10 cm.

Hereinafter, the sheet manufacturer 2000 will be described in detail.

The sheet manufacturer 2000 according to one embodiment of the present invention includes a first sheet roll 20 to supply a first carrier sheet 23, a first resin coating portion 25 to coat a first resin 27 on a surface of the first carrier sheet 23, a second sheet roll 30 to supply a second carrier sheet 33, a second resin coating portion 35 to coat a second resin 37 on a surface of the second carrier sheet 33, a second drying furnace 400, and a recovery tank 500 to recover the manufactured carbon fiber sheet molding compound 50.

The first carrier sheet 23 wound on the first sheet roll 20 may be coated with the first resin 27 on the surface thereof while passing through the first resin coating portion 25, and then the coated first carrier sheet 23 may be supplied to the sheet manufacturing portion 2000.

Carbon fibers 17 cut in the cutting device 300 may be sprayed onto the first carrier sheet 23 coated with the first resin 27 and be impregnated in the first resin 27.

Then, the second carrier sheet 33 wound on the second sheet roll 30 may be coated with the second resin 37 on the surface thereof while passing through the second resin coating portion 35 and the coated carrier sheet 33 may be supplied to the sheet manufacturing portion 2000.

In this case, the first resin 27 and the second resin 37 may be supplied to face and be united with each other, and the first resin 27 and the second resin 37 may be the same resins or different resins.

The first resin 27 and the second resin 37 may include the same compound as the sizing agent 50 described above and may include at least one of vinyl ester, unsaturated polyester, and epoxy.

Figure 2:
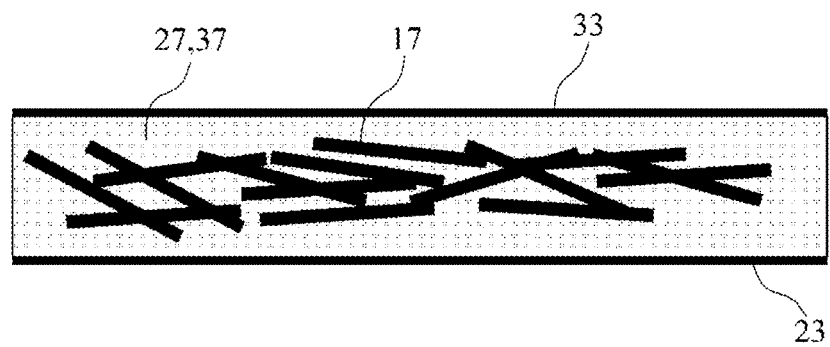
FIG. 2 is a cross-sectional view of a carbon fiber sheet molding compound manufactured according to one embodiment of the present invention.

A sheet 45 in which the first carrier sheet 23 and the second carrier sheet 33 are joined together one above the other may be formed in such a manner that the cut carbon fibers 17 are impregnated in the first resin 27 and the second resin 37 between the first carrier sheet 23 and the second sheet 33, as shown in FIG. 2.

The sheet 45 may be transferred to the second drying furnace 400 and be dried.

The second drying furnace 400 may further include a structure, such as a belt 420 for pressing the sheet 45, according to necessity.

The sheet 45 may be dried to a semi-cured state in the second drying furnace 400, and the carbon fiber sheet molding compound 50 may be manufactured through the drying process in the second drying furnace 400 and be stored in the recovery tank 500.

Hereinafter, the structure and effect of the present invention will be described in detail through an example and a comparative example. However, the present example is intended to further illustrate the present invention, and the scope of the present invention is not limited to the examples.

Example

A carbon fiber sheet molding compound was prepared using the carbon fiber sheet molding compound manufacturing apparatus of the present invention shown in FIG. 1.

In this case, a carbon fiber which had already been subjected to sizing treatment was used, and a sizing agent and resins were prepared by applying vinyl esters in the same manner. Also, the amount of the sizing agent coated on the carbon fiber was 5% by weight of the carbon fiber, and the length of the cut carbon fiber was set to 2 inches.

Comparative Example

A carbon fiber sheet molding compound was prepared in the same manner as in Example except that the carbon fiber was not passed through the fiber pretreatment portion and no further sizing treatment was performed.

Experimental Example

Adhesion Measurement

An interfacial adhesion between the resin and the carbon fiber of the carbon fiber sheet molding compounds, each prepared according to Example and Comparative Example, was confirmed through the interlaminar shear strength and the cross-sectional scanning electron microscope (SEM) photography.

(2) Mechanical Physical Property Measurement

Flexural strength and Charpy impact strength were measured as the mechanical physical properties of the carbon fiber sheet molding compounds, each prepared according to Example and Comparative Example, wherein the flexural strength was measured according to JIS K6911 and the Charpy impact strength was measured according to JIS K7077.

(3) Carbon Fiber Dispersion Measurement

In order to measure the carbon fiber dispersion obtained through the pretreatment of the carbon fibers contained in the carbon fiber sheet molding compound prepared according to Example and Comparative Example, the carbon fiber sheet molding compound was cut into a size of 50 cm×50 cm, a surface of the cut carbon fiber sheet molding compound is divided into 9 parts as shown below, and the carbon fiber volume content of each part was measured.

| (1) | (2) | (3) |
| (4) | (5) | (6) |
| (7) | (8) | (9) |

Figure 3A:
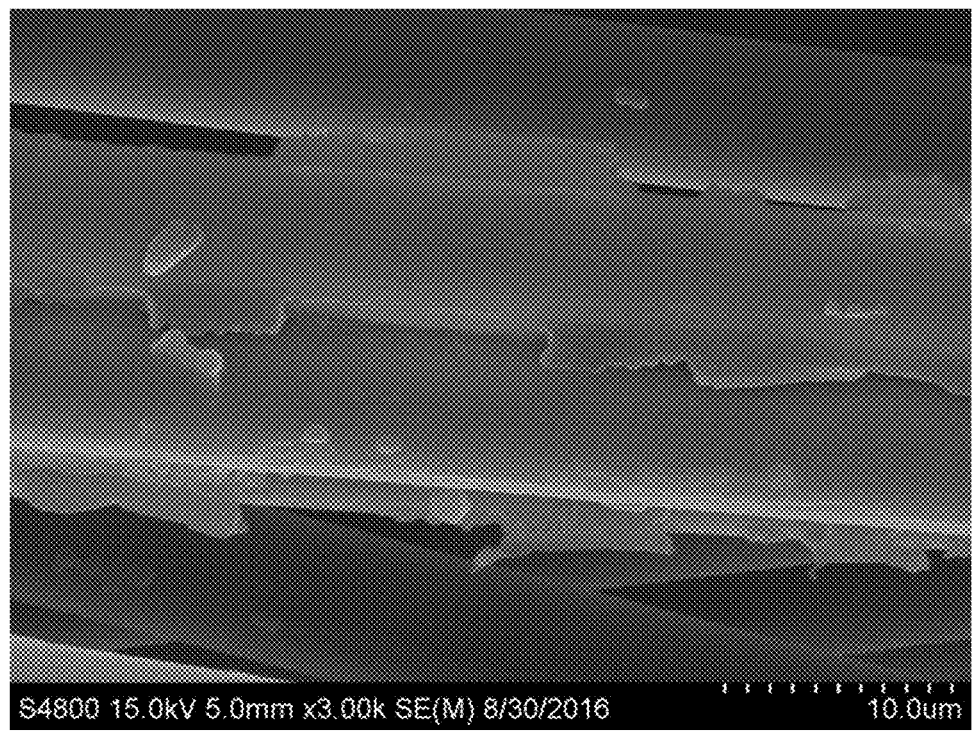
FIGS. 3a and 3b show scanning electron microscope (SEM) photographs of cross-sections of carbon fiber sheet molding compounds manufactured according to Example (A) and Comparative Example (B) of the present invention.
Figure 3B:
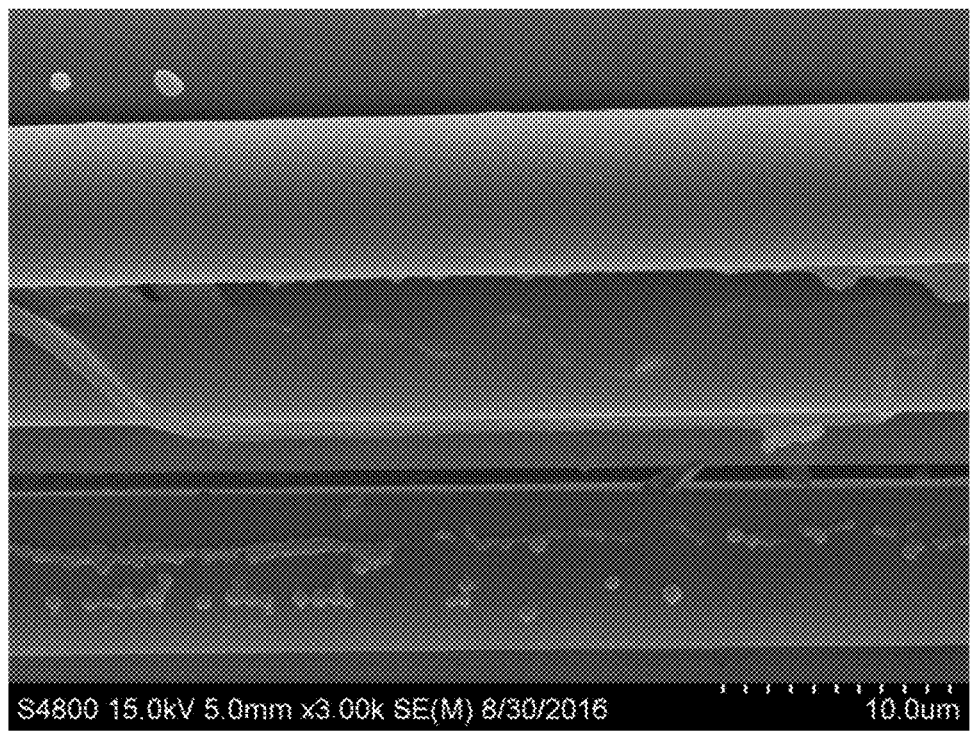

The results are shown in Table 1, Table 2, and FIG. 3.

TABLE 1

| | Flexural Strength (Mpa) | Impact Strength (KJ/m$^2$) | Interlaminar Shear Strength (Mpa) |
| --- | --- | --- | --- |
| Example | 440 | 89 | 47 |
| Comparative Example | 362 | 82 | 43 |

TABLE 2

| | Example (wt %) | Comparative Example (wt %) |
| --- | --- | --- |
| (1) | 31.3 | 28.9 |
| (2) | 30.1 | 26.9 |
| (3) | 31.9 | 27.2 |
| (4) | 30.9 | 29.9 |
| (5) | 29.9 | 31.6 |
| (6) | 31.2 | 27.8 |
| (7) | 31.6 | 29.1 |
| (8) | 30.1 | 28.1 |
| (9) | 31.2 | 27.8 |
| Average | 30.9 | 28.6 |
| Deviation | 0.7 | 1.5 |

First, as shown in Table 1 and FIG. 3, it was confirmed that the carbon fiber sheet molding compound according to Example had improved adhesion between the carbon fiber and the resin as compared to the carbon fiber sheet molding compound according to Comparative Example and accordingly the mechanical physical properties were excellent.

In addition, as shown in Table 2, it was confirmed that the carbon fiber content of each part of the carbon fiber sheet molding compound according to Example was uniformly distributed as compared with the carbon fiber sheet molding compound according to Comparative Example.

According to the above-described method and apparatus for manufacturing a carbon fiber sheet molding compound in accordance with the embodiments of the present invention, it is possible to improve adhesion and dispersion between a carbon fiber and a resin and achieve excellent mechanical physical properties.

A number of examples have been described above. Nevertheless, it will be understood that various modifications may be made. For example, suitable results may be achieved

| Reference Numerals | |
|---|---|
| 1000: fiber PRETREATMENT PORTION | |
| 2000: sheet MANUFACTURING PORTION | |
| 10: FIBER ROLL | 100: STORAGE TANK |
| 200: FIRST DRYING FURNACE | 300: CUTTING DEVICE |
| 20: FIRST SHEET ROLL | 30: SECOND SHEET ROLL |
| 400: second DRYING FURNACE | 500: RECOVERY TANK |

What is claimed is:

1. A method of manufacturing a carbon fiber sheet molding compound, the method comprising:
performing sizing treatment on a carbon fiber using a sizing agent;
cutting the sizing-treated carbon fiber into pieces;
spraying the pieces of carbon fiber onto a first resin coated on a surface of a first carrier sheet; and
uniting together a second resin coated on a second carrier sheet and a surface of the first resin,
wherein the sizing agent, the first resin, and the second resin include the same compounds, and
wherein the sizing treatment is performed in such a state in which the carbon fiber is spread to be 1.2 to 5 times as wide as an original width thereof.

2. The method of claim 1, wherein the sizing agent, first resin, and the second resin include at least one of vinyl ester, unsaturated polyester, and epoxy.

3. The method of claim 1, wherein in the sizing treatment of the carbon fiber, the carbon fiber is coated with the sizing agent in an amount of from 1 to 10% by weight based on the total weight of the carbon fiber.

4. An apparatus for manufacturing a carbon fiber sheet molding compound, the apparatus comprising:
a fiber pretreatment portion which performs sizing-treatment on a carbon fiber; and
a sheet manufacturing portion which manufactures a sheet using the carbon fiber pretreated by the fiber pretreatment portion,
wherein the fiber pretreatment portion sequentially includes a fiber roll to supply the carbon fiber, a storage tank containing a sizing agent, and a cutting device to cut the carbon fiber,
the sheet manufacturing portion includes a sheet roll to supply a carrier sheet and a resin coating portion containing a resin to be coated on a surface of the carrier sheet, and
the sizing agent and the resin include the same compound, and
wherein the storage tank includes a plurality of rollers and the plurality of rollers are arranged alternately vertically one above another in a depth direction of the storage tank.

5. The apparatus of claim 4, wherein the sizing agent and the resin include at least one of vinyl ester, unsaturated polyester, and epoxy.

6. The apparatus of claim 4, wherein each of the fiber pretreatment portion and the sheet manufacturing portion includes a drying furnace.

* * * * *